United States Patent
Ito et al.

(10) Patent No.: US 12,533,758 B2
(45) Date of Patent: Jan. 27, 2026

(54) PISTON RING CUTTING-OFF DEVICE

(71) Applicant: TPR Co., Ltd., Tokyo (JP)

(72) Inventors: Keisuke Ito, Tokyo (JP); Seiji Miyazaki, Tokyo (JP)

(73) Assignee: TPR Co., Ltd., Tokyo (JP)

( * ) Notice: Subject to any disclaimer, the term of this patent is extended or adjusted under 35 U.S.C. 154(b) by 399 days.

(21) Appl. No.: 18/276,081

(22) PCT Filed: Feb. 12, 2021

(86) PCT No.: PCT/JP2021/005366
§ 371 (c)(1),
(2) Date: Aug. 7, 2023

(87) PCT Pub. No.: WO2022/172421
PCT Pub. Date: Aug. 18, 2022

(65) Prior Publication Data
US 2023/0415283 A1    Dec. 28, 2023

(51) Int. Cl.
*B23P 19/08*   (2006.01)
*B25B 27/12*   (2006.01)

(52) U.S. Cl.
CPC ............ *B23P 19/088* (2013.01); *B25B 27/12* (2013.01)

(58) Field of Classification Search
CPC ...... B25B 27/12; B23P 19/006; B23P 19/088; B23P 19/003
See application file for complete search history.

(56) References Cited

FOREIGN PATENT DOCUMENTS

| | | |
|---|---|---|
| CN | 207097653 U | 3/2018 |
| JP | H02-75745 A | 3/1990 |
| JP | H04-105827 A | 4/1992 |
| JP | H04-173625 A | 6/1992 |
| JP | H06-277957 A | 10/1994 |

(Continued)

OTHER PUBLICATIONS

Office Action in CN Application No. 202180093139.3 dated May 30, 2025, 13 pages.

(Continued)

*Primary Examiner* — Seahee Hong
(74) *Attorney, Agent, or Firm* — MARSHALL, GERSTEIN & BORUN LLP

(57) ABSTRACT

A retaining unit that retains a stack body in which piston rings are stacked in an axial direction, a cutting-out unit that delivers a piston ring at the tip end of the stack body from the stack body, and a detecting unit that detects a boundary between the piston rings that are adjacent to each other in the stack body are included, and the cutting-out unit includes a moving unit that moves a pushing-out unit and a restricting unit, and after inserting the pushing-out unit and the restricting unit into a dividing portion that is a boundary between the piston ring at the tip end and a piston ring that is adjacent to the piston ring at the tip end in the stack body, in a state in which movement of the piston ring that is adjacent to the piston ring at the tip end in a delivering direction in which the piston ring at the tip end is delivered is restricted by the restricting unit, the moving unit moves the pushing-out unit in the delivering direction, so that the piston ring at the tip end is separated from the stack body, and the piston ring at the tip end is delivered along the retaining unit.

6 Claims, 14 Drawing Sheets

(56) References Cited

FOREIGN PATENT DOCUMENTS

| | | | |
|---|---|---|---|
| JP | 2005-111599 A | | 4/2005 |
| JP | 2006-088239 A | | 4/2006 |
| JP | 2006289569 A | * | 10/2006 |

OTHER PUBLICATIONS

Search Report in International Application No. PCT/JP2021/005366 dated Apr. 20, 2021, 2 pages.

* cited by examiner

PISTON RING CUTTING-OFF DEVICE

TECHNICAL FIELD

The present invention relates to a cutting-out apparatus for a piston ring mounted on a piston of an internal combustion engine.

BACKGROUND ART

An internal combustion engine mounted on a typical automobile adopts a configuration in which a combination of piston rings including a compression ring (pressure ring) and an oil ring is fitted to ring grooves formed in a piston. As the oil ring, a combination oil ring composed of a pair of segments (also referred to as side rails) and a spacer expander urging the pair of segments is known. In processes of manufacturing and machining the piston rings and a process of assembling the piston rings to the ring grooves of the piston, a piston ring at the tip end is cut out sequentially one by one from a plurality of piston rings in a stacked form. For example, Patent document 1 discloses an assembling apparatus for piston rings that cuts out a piston ring at the uppermost layer (tip end) of a plurality of piston rings (segments) retained in a layered form in a magazine. The apparatus includes a pair of cutting-out claws and causes one cutting-out claw of the pair of cutting-out claws to engage with a segment at the uppermost end of the segments in the layered form prior to the other cutting-out claw so that the segment can be precisely cut out.

CITATION LIST

Patent Document

[Patent document 1] Japanese Patent Laid-Open No. 2005-111599
[Patent document 2] Japanese Patent Laid-Open No. 2-75745
[Patent document 3] Japanese Patent Laid-Open No. 4-173625

SUMMARY OF THE INVENTION

Technical Problem

However, there has been a potential defect appearing in conventional art that when the width (thickness in the axial direction) of the piston ring is narrow, the adjacent piston rings cannot be successfully separated in cutting out, thereby failing to cut out the piston rings one by one, and a technique of more surely cutting out the piston rings one by one has been desired.

The present invention has been made in view of the aforementioned problem and the objective is to provide a technique capable of surely cutting out piston rings one by one in cutting out the piston rings.

Solution to Problem

To solve the aforementioned problem, the present invention adopts the following means. That is, the present invention is a cutting-out apparatus for a piston ring including a retaining unit extending in a rail form that is inserted into a hollow part of a cylindrical stack body formed of a plurality of piston rings stacked in an axial direction so as to retain the stack body, a cutting-out unit that separates a piston ring at a tip end of the stack body from the stack body retained by the retaining unit and delivers the piston ring at the tip end along the retaining unit, and a detecting unit that detects a boundary between the piston rings that are adjacent to each other in the stack body, in which the cutting-out unit includes a pushing-out unit, a restricting unit, and a moving unit that moves the pushing-out unit and the restricting unit, and after inserting the pushing-out unit and the restricting unit into a dividing portion that is a boundary between the piston ring at the tip end and a piston ring that is adjacent to the piston ring at the tip end in the stack body based on a detection result of the detecting unit, in a state in which movement of the piston ring that is adjacent to the piston ring at the tip end in a delivering direction in which the piston ring at the tip end is delivered is restricted by the restricting unit, the moving unit moves the pushing-out unit in the delivering direction, so that the piston ring at the tip end is separated from the stack body, and the piston ring at the tip end is delivered along the retaining unit.

According to the cutting-out apparatus according to the present invention, the detecting unit detects a boundary between the piston rings that are adjacent to each other, so that even when a step (positional deviation in the axial direction of the piston ring at an abutment between opposite ends of the piston ring) is formed at the abutment of the piston ring, the pushing-out unit and the restricting unit can be inserted into the dividing portion. Further, after inserting the pushing-out unit and the restricting unit into the dividing portion, in a state in which movement of the piston ring that is adjacent to the piston ring at the tip end in the stack body in the delivering direction is restricted by the restricting unit, the piston ring at the tip end is moved in the delivering direction by the pushing-out unit, so that the piston ring at the tip end can be surely separated from the stack body. In this manner, the piston rings can be surely cut out from the stack body one by one.

Further, in the present invention, the retaining unit may retain the plurality of piston rings such that abutments of the plurality of piston rings are aligned so as to form a slit in the stack body extending in the axial direction of the stack body, the pushing-out unit and the restricting unit may be inserted into the dividing portion in a direction from the slit toward the hollow part of the stack body, the stack body may be sectioned into a first region and a second region by the slit as seen in a direction in which the pushing-out unit and the restricting unit are inserted into the dividing portion, the pushing-out unit may include a first pushing-out claw inserted into the dividing portion in the first region and a second pushing-out claw inserted into the dividing portion in the second region, and the restricting unit may include a first restricting claw inserted into the dividing portion in the first region and a second restricting claw inserted into the dividing portion in the second region.

That is, the cutting-out apparatus according to the present invention may be configured such that the pushing-out unit and the restricting unit are inserted into the dividing portion in each of the first region and the second region that are regions sandwiching the slit. When the positions of the opposite ends of the piston ring at the abutment are deviated from each other in the axial direction, the adjacent piston rings in the stack body are more likely to be entangled near the abutments. Meanwhile, in the present invention, the pushing-out unit and the restricting unit are inserted into both sides of the abutment (slit) to perform operation of separating the piston rings on both sides of the abutment, so that the piston ring at the tip end can be surely separated from the stack body. In this manner, the piston rings can be more surely cut out from the stack body one by one.

Further, in the present invention, the detecting unit may acquire images of the first region and the second region and detect the dividing portion in each of the first region and the second region based on the images acquired.

According to the present invention, the dividing portion is detected in each of the first region and the second region, so that the pushing-out unit and the restricting unit can be surely inserted into the dividing portion in each of the first region and the second region.

Furthermore, in the present invention, the moving unit may include an insertion member that moves in a direction in which the pushing-out unit and the restricting unit are inserted into the dividing portion of the stack body, and the pushing-out unit and the restricting unit may be coupled to the insertion member such that the pushing-out unit and the restricting unit can be displaced relative to the insertion member in the axial direction of the piston rings in the stack body.

According to the present invention as such, when inserting the pushing-out unit and the restricting unit into the dividing portion, any deviation between the positions of the pushing-out unit and the restricting unit and of the dividing portion in the delivering direction or any deviation angle when the pushing-out unit and the restricting unit are inclined relative to the inserting direction can be accepted, so that inserting the pushing-out unit and the restricting unit into the dividing portion can be facilitated. In this manner, the pushing-out unit and the restricting unit can be surely inserted into the dividing portion.

The present invention is applicable to cutting out of the piston ring. The piston ring to be cut out in the present invention includes a segment for use in a combination oil ring including the segment and a spacer expander, a compression ring, and the like.

Advantageous Effects of Invention

According to the present invention, piston rings can be surely cut out one by one in cutting out the piston rings.

DESCRIPTION OF EMBODIMENTS

Hereinafter, an embodiment of a cutting-out apparatus for a piston ring (hereinafter also simply referred to as a cutting-out apparatus) according to the present invention will be described. A cutting-out apparatus 100 described below is an application of the present invention to cutting out a segment for use in a combination oil ring. The segment is an example of the piston ring to be cut out in the present invention, and the present invention is also applicable to a cutting-out apparatus for a compression ring other than the segment. Further, the technical scope of the invention is not limited to only the configurations described in the embodiment below unless otherwise particularly stated.

Figure 1:
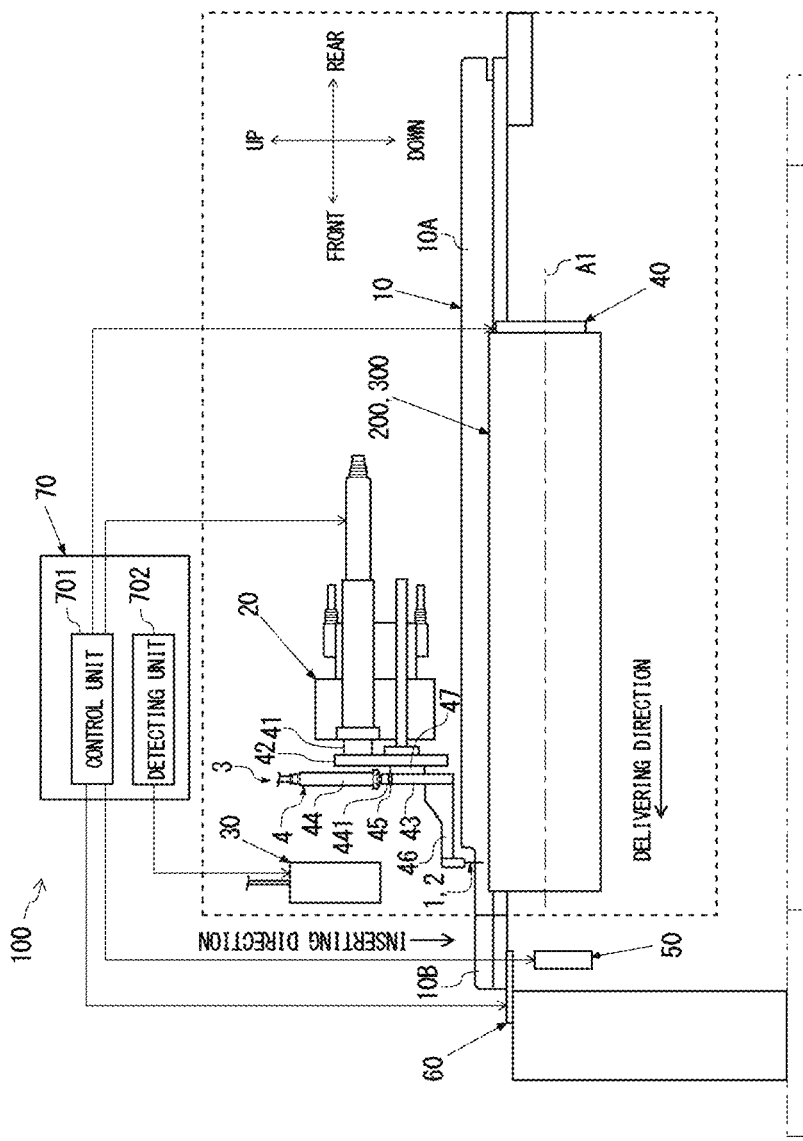
FIG. 1 is a side view of a cutting-out apparatus according to an embodiment.
Figure 2:
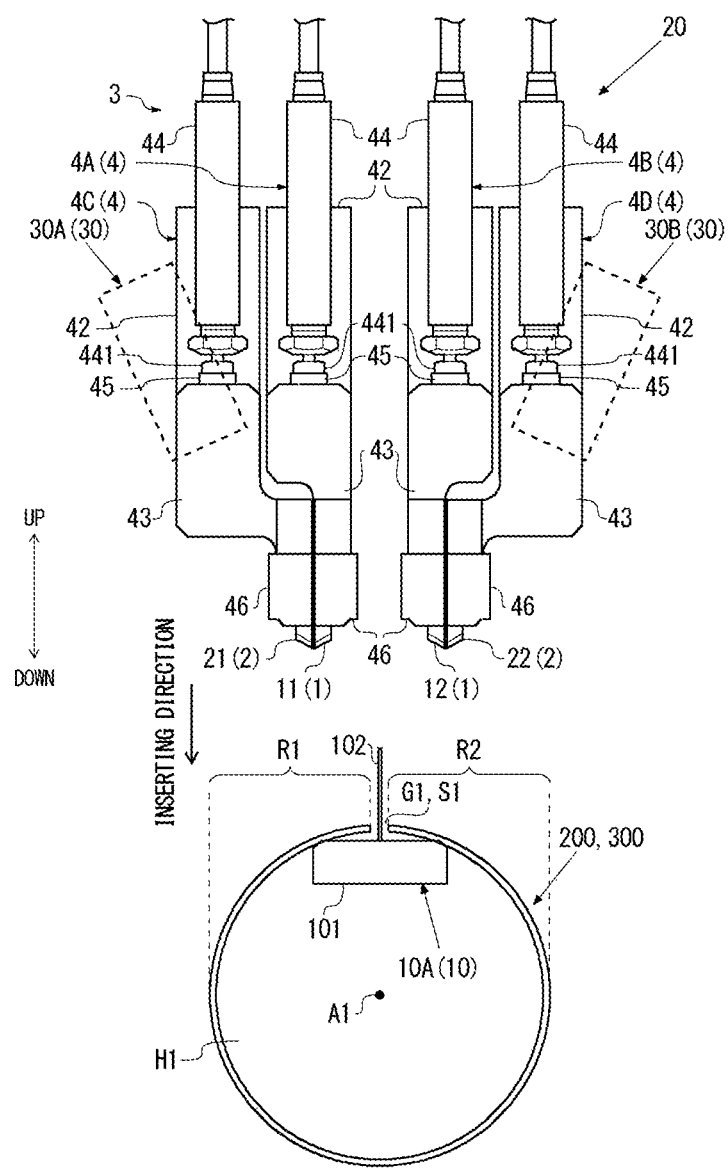
FIG. 2 is a front view of a portion with a dotted line of FIG. 1.

FIG. 1 is a side view of the cutting-out apparatus 100 according to the embodiment. Further, FIG. 2 is a front view of a portion with a dotted line of FIG. 1. The cutting-out apparatus 100 forms a supply line for a segment 200 in a manufacturing process for a piston ring. The segment 200 is a constituent member of a combination oil ring. The combination oil ring includes a pair of segments 200, 200 and a spacer expander urging the pair of segments 200, 200, and is fitted to a ring groove formed on an outer periphery surface of a piston in an internal combustion engine so as to control lubrication for a cylinder and the piston ring. The cutting-out apparatus 100 cuts out the segments 200 sequentially one by one from a stack body 300 with a plurality of segments 200 cylindrically stacked and supplies the segments 200 to a line in the following step. Hereinafter, the configuration of the cutting-out apparatus 100 will be described.

Apparatus Configuration

As illustrated in FIG. 1 and FIG. 2, the cutting-out apparatus 100 includes a retaining unit 10, a cutting-out unit 20, a camera 30, a pusher 40, a stopper 50, a rail moving unit 60, and a control device 70.

As illustrated in FIG. 1 and FIG. 2, the retaining unit 10 is a member in a rail form horizontally disposed and extending in the front-back direction, and is inserted into the segments 200 so as to retain the segments 200 in a suspending manner. The plurality of segments 200 retained by the retaining unit 10 is stacked in the front-back direction (extending direction of the retaining unit 10) so as to form the cylindrical stack body 300. The center axis A1 of the stack body 300 is parallel to the extending direction of the retaining unit 10. That is, the plurality of segments 200 is stacked in the axial direction of the segments 200. In the stack body 300, the plurality of segments 200 is arranged with almost no gap. As illustrated in FIG. 2, the retaining unit 10 is in a state of being inserted through a hollow part H1 of the stack body 300.

Further, as illustrated in FIG. 2, the retaining unit 10 includes an extension part 101 in a substantially rectangular shape in a cross-sectional view extending in the front-back direction and a raised part 102 raised on an upper surface of the extension part 101 and extending in the front-back direction. The extension part 101 engages with an inner periphery surface of the segment 200 and the raised part 102 is inserted into an abutment G1 of the segment 200, so that the segment 200 is retained in a suspending manner with the abutment G1 on the upper side. The raised part 102 is inserted into the abutment G1 of the segment 200, so that the rotation of the segment 200 and the stack body 300 about the axis is restricted. The segment 200 can slide along the retaining unit 10 while the abutment G1 is guided by the extension part 101.

Furthermore, as illustrated in FIG. 1, the retaining unit 10 is divided into front and rear portions. Of the retaining unit 10 divided into the front and rear portions, the portion on the rear side is a first rail 10A and the portion on the front side is a second rail 10B. The stack body 300 is retained by the first rail 10A. Although the detail will be described later, the retaining unit 10 can be in a state of the first rail 10A and the second rail 10B connected together and in a state of the first rail 10A and the second rail 10B separated, by the second rail 10B moving in the front-back direction along with the front-back movement of a rail moving unit 60.

Figure 3:
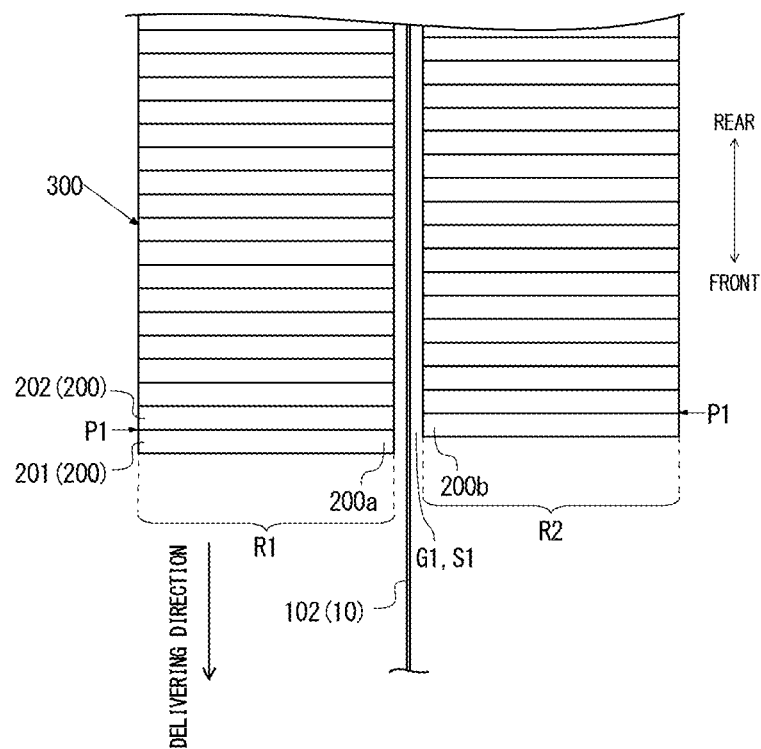
FIG. 3 is a top view of a stack body retained by a retaining unit.

FIG. 3 is a top view of the stack body 300 retained by the retaining unit 10. The rotation of the segment 200 about the axis is restricted by a second pushing-out claw 12, so that the abutments G1 of the plurality of segments 200 are aligned in the axial direction as illustrated in FIG. 3. With the plurality of abutments G1 continuously arranged in the axial direction, a slit depicted by a reference sign S1 extending in the axial direction is formed in the stack body 300. Further, as illustrated in FIG. 3, in a top view, the stack body 300 is sectioned into a first region R1 and a second region R2 by the slit S1. Hereinafter, of the plurality of segments 200 forming the stack body 300, the segment 200 at the tip end (front end) is a first segment 201 and the segment 200 adjacent to the first segment 201, that is, the segment 200 that is the second from the tip end, is a second segment 202. Furthermore, in the stack body 300, a boundary between the first segment 201 and the second segment 202 is a dividing portion P1. The dividing portion P1 is a contacting section or a gap between the first segment 201 and the second segment 202 and is a portion where the stack body 300 is divided for cutting out the first segment 201 from the stack body 300.

Here, in general, the piston ring may be manufactured in a shape in which the opposite ends are deviated in the axial direction like a spring lock washer due to deformation at the time of forming. This deformation tends to increase as the width (thickness) in the axial direction becomes narrower like the segment. In the present embodiment, as illustrated in FIG. 3, due to deformation of the segment 200 at the time of forming, opposite ends 200a, 200b forming the abutment G1 form a step in the axial direction of the segment 200. That is, the positions of the opposite ends 200a, 200b of the segment 200 at the abutment G1 are deviated from each other in the axial direction. Therefore, the position in the front-back direction of the dividing portion P1 differs between the first region R1 and the second region R2 sandwiching the slit S1. In the present example, the dividing portion P1 in the first region R1 is positioned on the front side relative to the dividing portion P1 in the second region R2, but the present invention is not limited to this. The positions of the opposite ends 200a, 200b of the segment 200 at the abutment G1 may be deviated relative to each other in the axial direction such that the dividing portion P1 in the first region R1 is positioned on the rear side relative to the dividing portion P1 in the second region R2.

The cutting-out unit 20 cuts out the first segment 201 from the stack body 300 and delivers the first segment 201 forward along the retaining unit 10. As illustrated in FIG. 1, the cutting-out unit 20 includes a pushing-out unit 1, a restricting unit 2, and a moving unit 3.

The pushing-out unit 1 is a member to be inserted into the dividing portion P1 in the stack body 300 and then to move forward (in the delivering direction of the first segment 201) so as to push the first segment 201 forward. The restricting unit 2 is a member to be inserted into the dividing portion P1 in the stack body 300 together with the pushing-out unit 1 and to restrict a forward movement of the second segment 202 so as to separate the first segment 201 and the second segment 202. As illustrated in FIG. 2, the pushing-out unit 1 and the restricting unit 2 are inserted into the stack body 300 from the upper side of the stack body 300. The direction in which the pushing-out unit 1 and the restricting unit 2 are inserted into the stack body 300 corresponds to a direction from the slit S1 (abutment G1) toward the hollow part H1 (more specifically, the center axis A1 of the stack body) of the stack body 300.

Further, as illustrated in FIG. 2, the pushing-out unit 1 is composed of a pair of pushing-out claws 11, 12, and the restricting unit 2 is composed of a pair of restricting claws 21, 22. The pair of pushing-out claws 11, 12 and the pair of restricting claws 21, 22 are cutting-out edges extending in the up-down direction with the lower ends inclined and are provided orthogonally to the axial direction of the segment 200 in the stack body 300 so as to be able to be inserted into the dividing portion P1. The first pushing-out claw 11 as one of the pair of pushing-out claws 11, 12 is inserted into the dividing portion P1 in the first region R1, and the second pushing-out claw 12 as the other is inserted into the dividing portion P1 in the second region R2. Furthermore, the first restricting claw 21 as one of the pair of restricting claws 21, 22 is inserted into the dividing portion P1 in the first region R1, and the second restricting claw 22 as the other is inserted into the dividing portion P1 in the second region R2. Here, as illustrated in FIG. 2, the pair of restricting claws 21, 22 are disposed on the outer sides of the pair of pushing-out claws 11, 12, respectively. Therefore, the pair of pushing-out claws 11, 12 are inserted into positions closer to the slit S1 (abutment G1) as compared to the pair of restricting claws 21, 22. In the present embodiment, the pushing-out claws 11, 12 are positioned closer to the slit S1 (abutment G1) as compared to the restricting claws 21, 22, but the restricting claws 21, 22 may be positioned closer to the slit S1 (abutment G1) as compared to the pushing-out claws 11, 12. In addition, the number of the pushing-out claws and the restricting claws need not to be two for each (pair). The number of the pushing-out claws and the restricting claws may be one for each or may be three or more. Further, the numbers of the pushing-out claws and the restricting claws may not be the same.

The moving unit 3 moves the pushing-out unit 1 and the restricting unit 2 so as to cut out the first segment 201. As illustrated in FIG. 2, the moving unit 3 includes a moving mechanism 4 corresponding to each of the pair of pushing-out claws 11, 12 and the pair of restricting claws 21, 22. Hereinafter, the moving mechanism 4 for moving the first pushing-out claw 11 is referred to as a moving mechanism 4A, the moving mechanism 4 for moving the second pushing-out claw 12 as a moving mechanism 4B, the moving mechanism 4 for moving the first restricting claw 21 as a moving mechanism 4C, and the moving mechanism 4 for moving the second restricting claw 22 as a moving mechanism 4D, and when description is made without distinguishing these, they are simply referred to as the moving mechanism 4. The moving mechanism 4A, the moving mechanism 4B, the moving mechanism 4C, and the moving mechanism 4D are independently controlled by the control device 70. As illustrated in FIG. 1, the moving mechanism 4 includes a first linear actuator 41, a first moving body 42, a second moving body 43, a second linear actuator 44, a coupling member 45, an arm 46, and a linear guide 47.

The first linear actuator 41 is configured with a servo motor controlled by the control device 70, a ball screw driven by the servo motor to rotate, a traveling body that reciprocates in the front-back direction along with the rotation of the ball screw, a linear guide that guides the front-back movement of the traveling body, and the like. The first moving body 42 is a plate-like member that is coupled to the first linear actuator 41 and that moves in the front-back direction in accordance with the driving of the first linear actuator 41. The second moving body 43 is a plate-like member that is coupled to the first moving body 42 via the linear guide 47. The second linear actuator 44 is a linear actuator controlled by the control device 70. The second linear actuator 44 includes a rod 441 that reciprocates in the up-down direction. The coupling member 45 is a member that couples the second moving body 43 and the rod 441. With the second moving body 43 and the rod 441 coupled together, the second moving body 43 moves in the up-down direction in accordance with the driving of the second linear actuator 44. In the present embodiment, a floating joint utilizing a spherical surface contact is used as the coupling member 45. The linear guide 47 is a member that guides the up-down movement of the second moving body 43. In the present embodiment, an LM guide (Registered Trademark) utilizing the rolling of a ball is used as the linear guide 47. The arm 46 is a member that couples the second moving body 43 with the pushing-out unit 1 and the restricting unit 2. The arm 46 extends forward from the second moving body 43, and upper ends of the pushing-out unit 1 and the restricting unit 2 are connected to a lower surface of a tip end of the arm 46. The first moving body 42 moves in the front-back direction in accordance with the driving of the first linear actuator 41, so that the pushing-out unit 1 and the restricting unit 2 move in the front-back direction. Further, the second moving body 43 moves in the up-down direction in accordance with the driving of the second linear actuator 44, so that the pushing-out unit 1 and the restricting unit 2 move in the up-down direction.

The camera 30 is an image capturing device that is disposed above the retaining unit together with an illumination device (not illustrated) and that captures an image of the stack body 300 in accordance with the control by the control device 70 to acquire the image. As illustrated in FIG. 2, the cutting-out apparatus 100 includes two cameras 30A, 30B, the camera acquiring an image of the first region R1 of the stack body 300, the camera 30B acquiring an image of the second region R2.

The pusher 40 and the stopper 50 are members that move in the front-back direction in accordance with the control by the control device 70 to contact the segment 200 and the stack body 300 so as to position the segment 200 and the stack body 300. The pusher 40 is disposed on the rear side of the stack body 300, and the stopper 50 is disposed on the front side of the stack body 300.

The rail moving unit 60 is a member that supports the second rail 10B and moves in the front-back direction in accordance with the control by the control device 70 so as to move the second rail 10B in the front-back direction. The rail moving unit 60 is configured with a servo motor, a ball screw, a traveling body, a linear guide, and the like.

The control device 70 includes a processor such as a CPU (Central Processing Unit), an I/O interface, and the like, and controls the cutting-out unit 20, the camera 30, the pusher 40, the stopper 50, and the rail moving unit 60 by executing predetermined programs. The control device 70 includes, as a processing unit, a control unit 701 and a detecting unit 702. The control unit 701 controls the cutting-out unit 20, the pusher 40, the stopper 50, and the rail moving unit 60. The detecting unit 702 detects a boundary between the segments 200 that are adjacent to each other in the stack body 300 based on the image acquired by the camera 30. The details of the processing executed by the detecting unit 702 will be described later.

Method for Cutting Out Piston Ring

Figure 4:
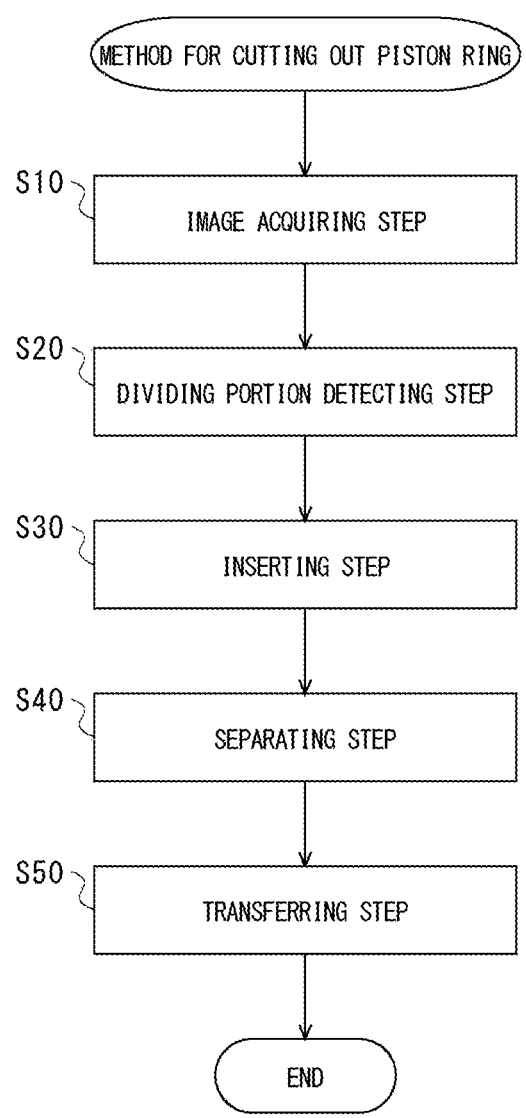
FIG. 4 is a flowchart of a method for cutting out a piston ring by the cutting-out apparatus.
Figure 5:
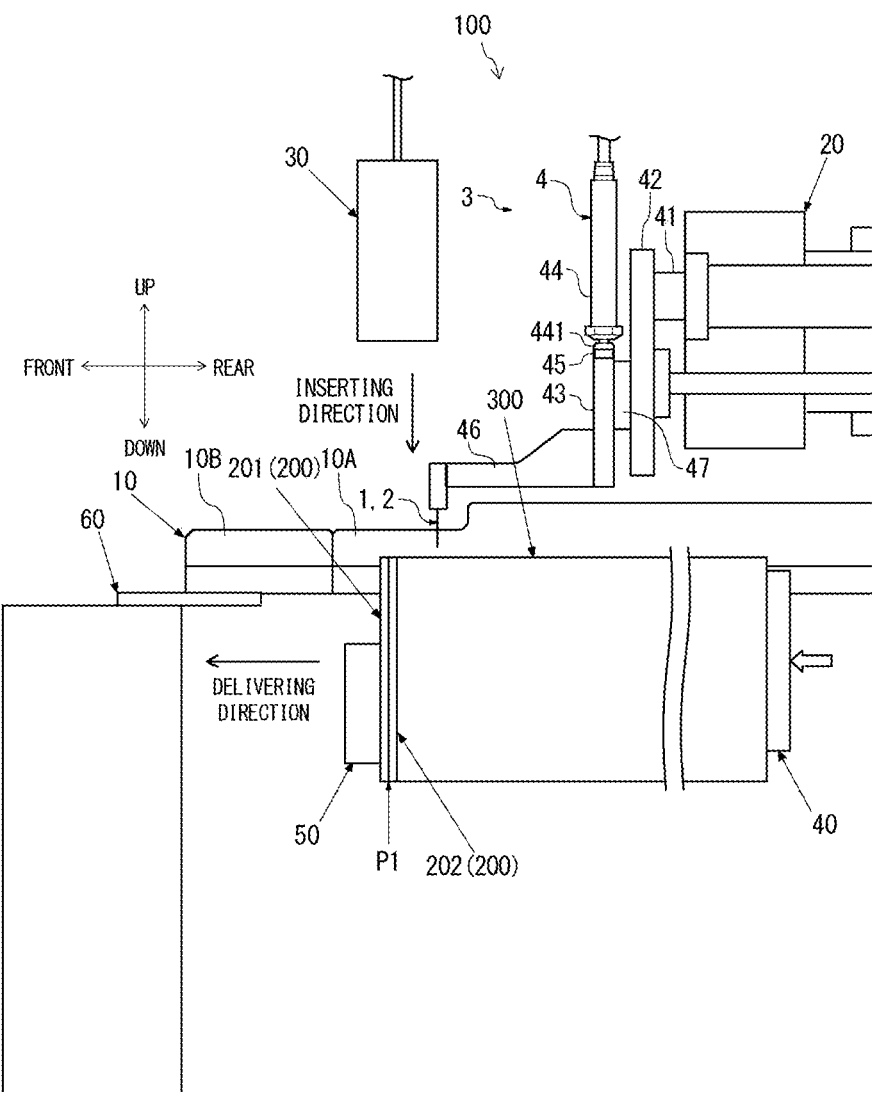
FIG. 5 is a side view of the cutting-out apparatus for explaining an image acquiring step.
Figure 6:
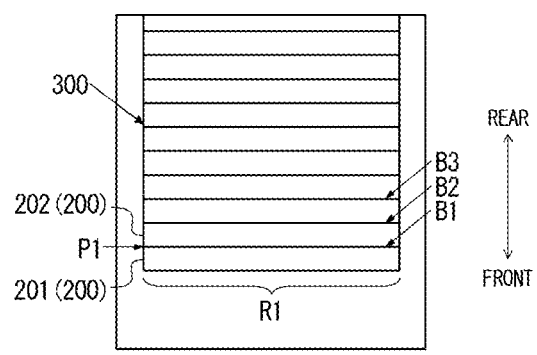
FIG. 6 is a view illustrating an example of an image acquired by a camera.

Hereinafter, a method for cutting out the first segment 201 (method for cutting out the piston ring) at the tip end from the stack body 300 using the cutting-out apparatus 100 will be described. FIG. 4 is a flowchart of the method for cutting out the piston ring by the cutting-out apparatus 100. First, in an image acquiring step of step S10, images of the first region R1 and the second region R2 of the stack body 300 are acquired by the camera 30. FIG. 5 is a side view of the cutting-out apparatus 100 for explaining the image acquiring step. In the image acquiring step, first, the stack body 300 is positioned at a predetermined image capturing position within the field of view of the camera 30. The stack body 300 is positioned by the pusher 40 and the stopper 50. Specifically, the pusher 40 is advanced by the control of the control unit 701 of the control device 70 so as to push the stack body 300 forward bringing it into contact with the stopper 50 standing by at a predetermined position. In this manner, as illustrated in FIG. 5, the stopper 50 contacts the front end (first segment 201) of the stack body 300, and the pusher 40 contacts the rear end of the stack body 300 so that the stack body 300 is positioned at the image capturing position. With the stack body 300 positioned at the image capturing position, an image of the first region R1 is captured by the camera 30A, and an image of the second region R2 is captured by the camera 30B so as to acquire the images of the first region R1 and the second region R2. FIG. 6 is a view illustrating an example of an image acquired by the camera 30. In FIG. 6, as an example, an image of the first region R1 acquired by the camera 30A is illustrated. As illustrated in FIG. 6, the camera 30 acquires an image including at least a boundary B1 between the first segment 201 and the second segment 202.

Next, in a dividing portion detecting step of step S20, the detecting unit 702 of the control device 70 acquires the images of the first region R1 and the second region R2 from the camera 30 and detects the dividing portion P1 in each of the first region R1 and the second region R2. Here, as illustrated in FIG. 6, in the stack body 300, there is a plurality of boundaries between the segments 200 that are adjacent to each other. Of the plurality of boundaries, the n-th (n is an integer) boundary from the tip end side (front end side) of the stack body 300 is a boundary Bn. In image processing performed by the detecting unit 702, the acquired image is subjected to an edge detection for detecting the boundary between the segments 200 in the stack body 300. Then, the detecting unit 702 specifies, as the dividing portion P1, a boundary closest to the tip end of the stack body 300 among the detected plurality of boundaries. In this manner, the boundary B1 between the first segment 201 and the second segment 202 is specified as the dividing portion P1.

Figure 7:
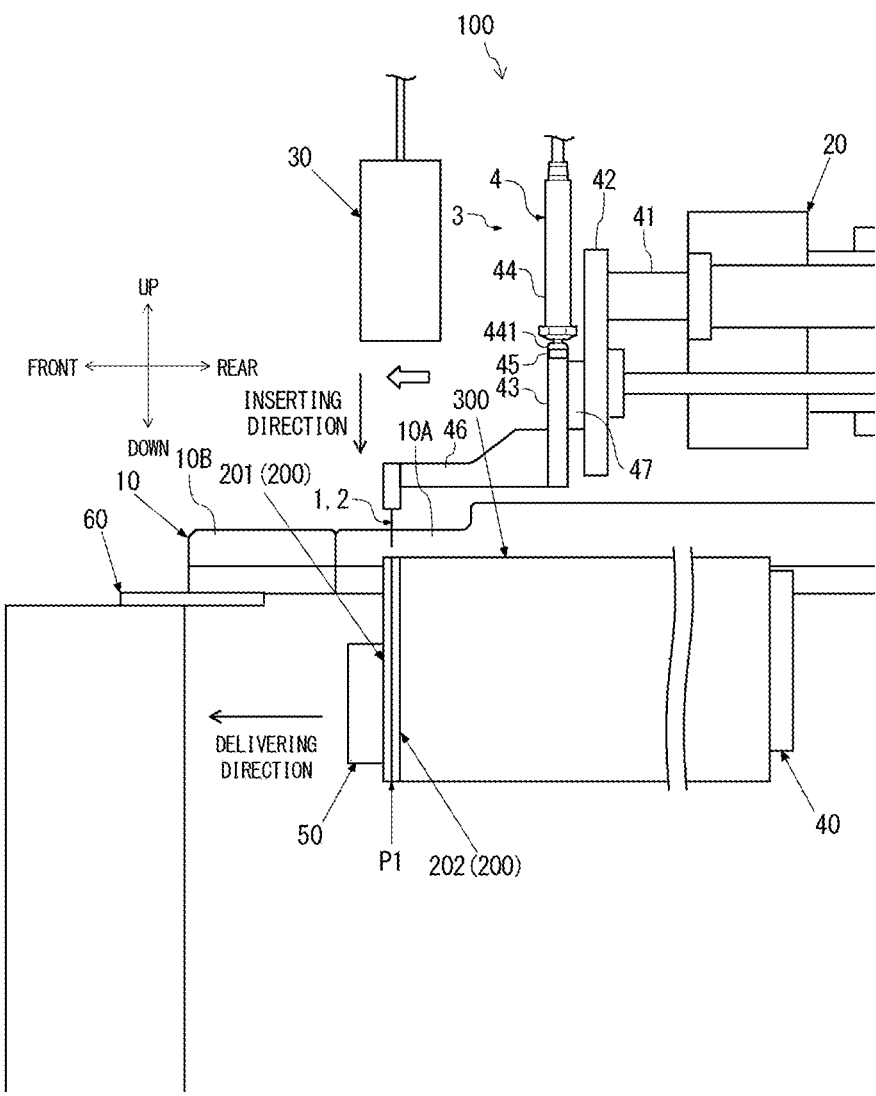
FIG. 7 is a side view (1) of the cutting-out apparatus for explaining an inserting step.
Figure 8:
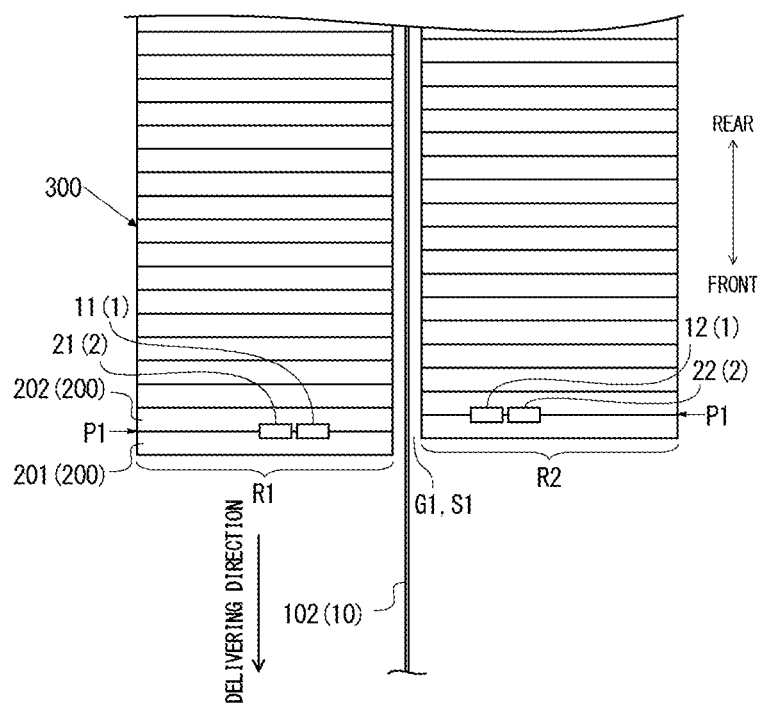
FIG. 8 is a top view illustrating a positional relation between a pushing-out unit and a restricting unit and the stack body in the inserting step.
Figure 9:
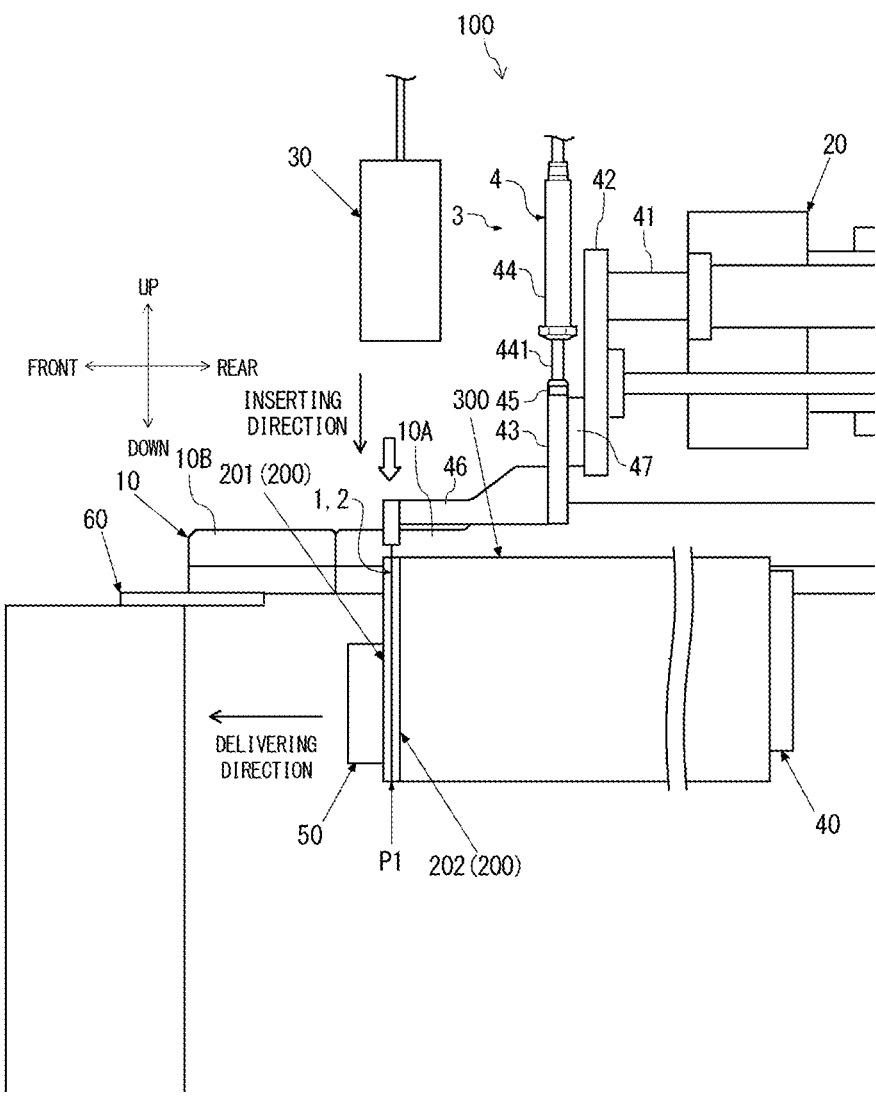
FIG. 9 is a side view (2) of the cutting-out apparatus for explaining the inserting step.
Figure 10:
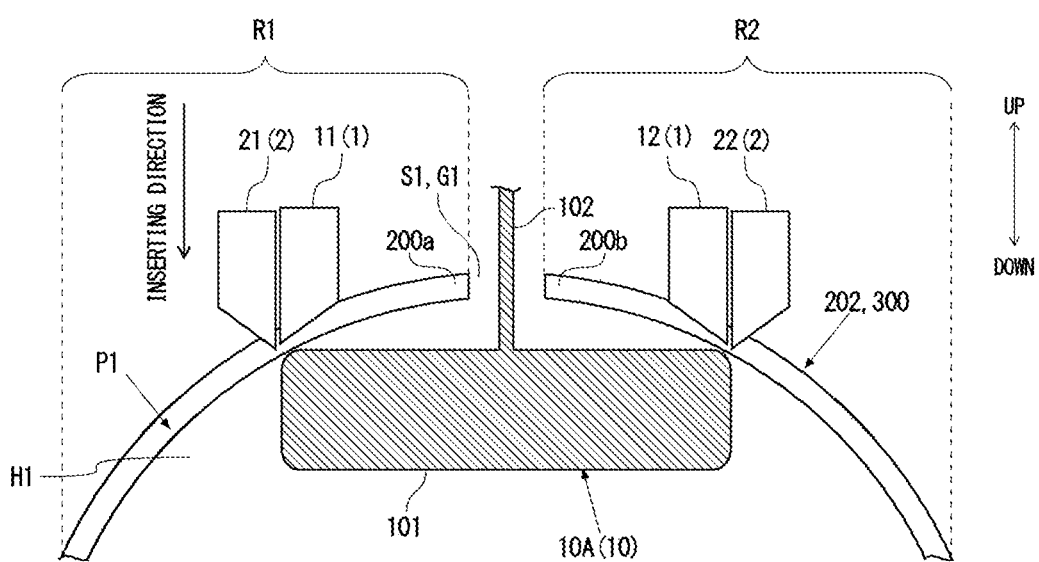
FIG. 10 is an enlarged cross-sectional view of a dividing portion of the cutting-out apparatus in the inserting step.

Next, in an inserting step of step S30, the pushing-out unit 1 and the restricting unit 2 are inserted into the dividing portion P1. FIG. 7 is a side view of the cutting-out apparatus 100 for explaining the inserting step. FIG. 8 is a top view illustrating the positional relation between the pushing-out unit 1 and the restricting unit 2 and the stack body 300 in the inserting step. FIG. 9 is a side view of the cutting-out apparatus 100 for explaining the inserting step. FIG. 10 is an enlarged cross-sectional view of the dividing portion of the cutting-out apparatus 100 in the inserting step.

In the inserting step, first, as illustrated in FIG. 7, the pushing-out unit 1 and the restricting unit 2 are moved in the front-back direction so as to match the positions of the pushing-out unit 1 and the restricting unit 2 in the front-back direction to the position of the dividing portion P1 in the front-back direction. More specifically, the control unit 701 of the control device 70 drives the first linear actuator 41 of the moving mechanism 4 based on the detection result of the detecting unit 702 in the dividing portion detecting step to move the first moving body 42 in the front-back direction, so that the pushing-out unit 1 and the restricting unit 2 are disposed immediately above the dividing portion P1. As described above, in the stack body 300, due to the step (positional deviation between the opposite ends 200a, 200b in the axial direction) formed at the abutment G1 of the segment 200, the position of the dividing portion P1 in the front-back direction differs between the first region R1 and the second region R2. Therefore, the control unit 701 independently controls the first linear actuator 41 of the moving mechanism 4A, the first linear actuator 41 of the moving mechanism 4B, the first linear actuator 41 of the moving mechanism 4C, and the first linear actuator 41 of the moving mechanism 4B so as to dispose the first pushing-out claw 11, the second pushing-out claw 12, the first restricting claw 21, and the second restricting claw 22 immediately above the P1 that each of them corresponds. In this manner, as illustrated in FIG. 8, the first pushing-out claw 11 and the first restricting claw 21 are disposed immediately above the dividing portion P1 in the first region R1, and the second pushing-out claw 12 and the second restricting claw 22 are disposed immediately above the dividing portion P1 in the second region R2. In the axial direction of the segments 200 in the stack body 300, the first pushing-out claw 11 and the first restricting claw 21 are disposed at the same position, and the second pushing-out claw 12 and the second restricting claw 22 are disposed at the same position that is on the rear end side of the stack body 300 relative to the first pushing-out claw 11 and the first restricting claw 21.

Subsequently, in the inserting step, as illustrated in FIG. 9, the pushing-out unit 1 and the restricting unit 2 are moved downward (in the inserting direction) so that the pushing-out unit 1 and the restricting unit 2 are inserted into the dividing portion P1. More specifically, the control unit 701 drives the second linear actuator 44 of the moving mechanism 4 to lower the second moving body 43 so as to insert the pushing-out unit 1 and the restricting unit 2 into the dividing portion P1. In this manner, as illustrated in FIG. 10, the first pushing-out claw 11 and the first restricting claw 21 are inserted into the dividing portion P1 in the first region R1, and the second pushing-out claw 12 and the second restricting claw 22 are inserted into the dividing portion P1 in the second region R2. In this manner, the pushing-out unit 1 and the restricting unit 2 are interposed between the first segment 201 and the second segment 202. Here, as described above, the coupling member 45 that couples the rod 441 of the second linear actuator 44 and the second moving body 43 is a floating joint. Therefore, the pushing-out unit 1 and the restricting unit 2 coupled to the rod 441 via the arm 46 and the coupling member 45 can be displaced in a very small range relative to the rod 441 in the axial direction (that is, the front-back direction) of the segment 200. In this manner, any deviation between the positions of the pushing-out unit 1 and the restricting unit 2 and of the dividing portion P1 in the front-back direction or any deviation angle when the pushing-out unit 1 and the restricting unit 2 are inclined relative to the up-down direction is accepted, so that inserting the pushing-out unit 1 and the restricting unit 2 into the dividing portion P1 is facilitated.

Figure 11:
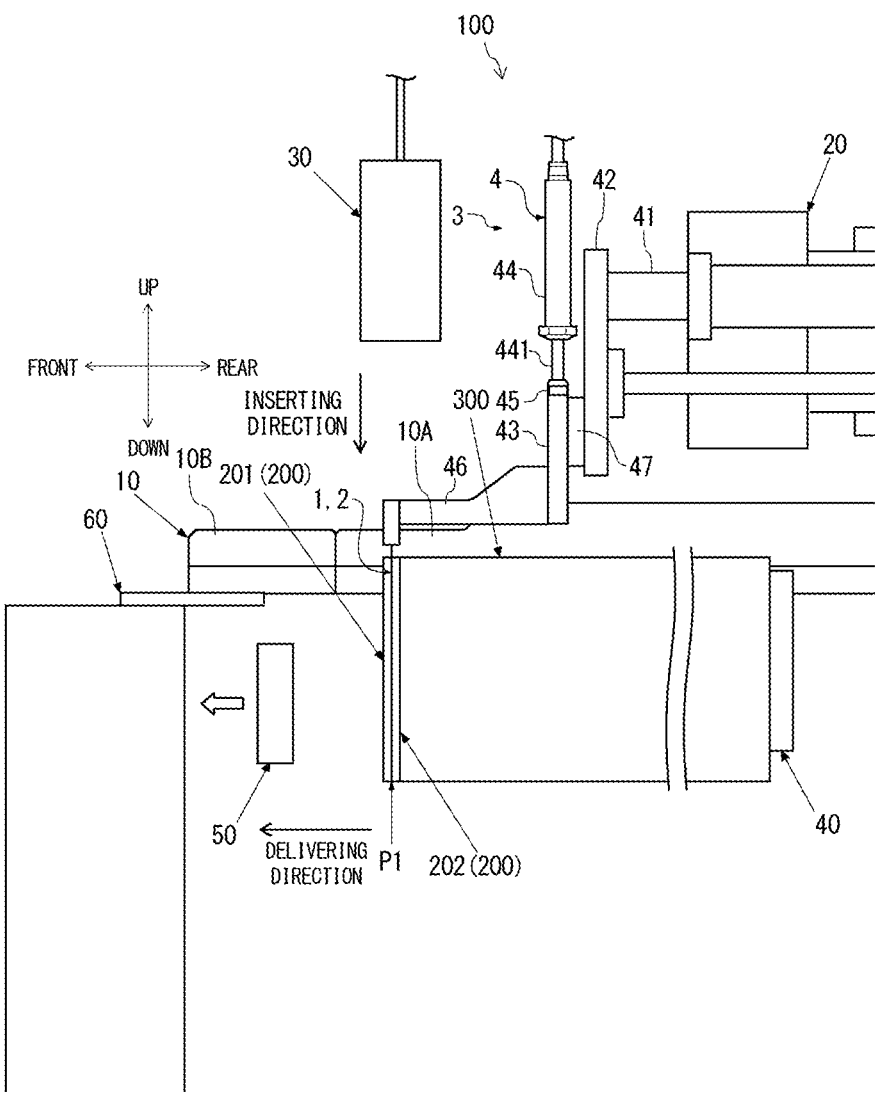
FIG. 11 is a side view (1) of the cutting-out apparatus for explaining a separating step.
Figure 12:
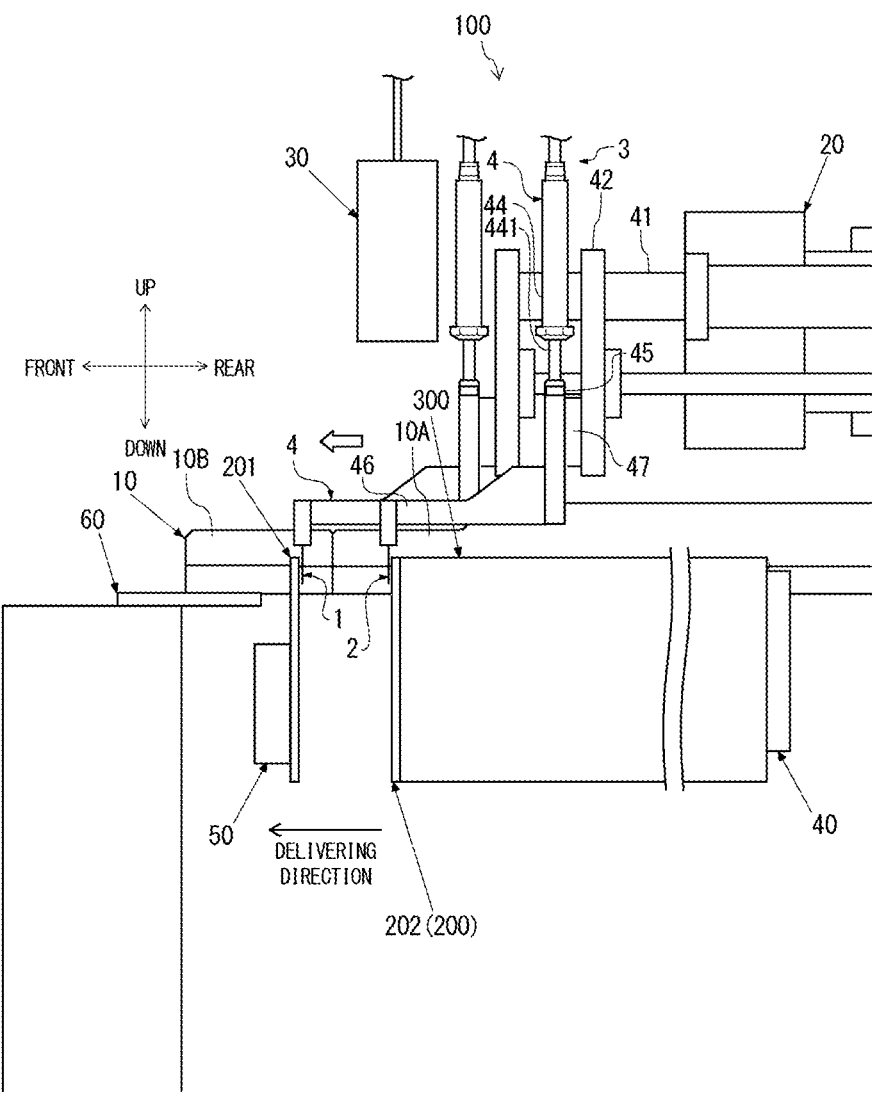
FIG. 12 is a side view (2) of the cutting-out apparatus for explaining the separating step.
Figure 13:
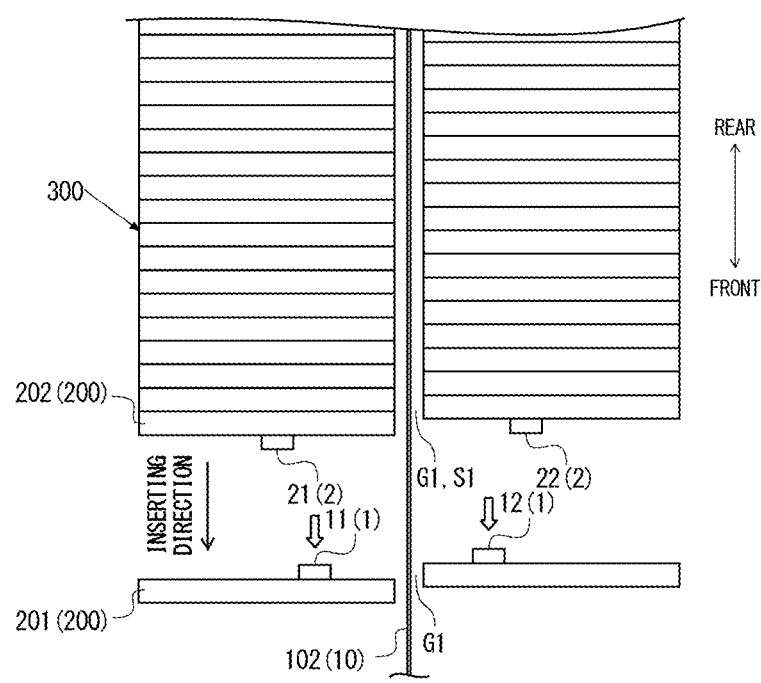
FIG. 13 is a top view illustrating a positional relation between the pushing-out unit and the restricting unit and the stack body in the separating step.

Next, in a separating step of step S40, the first segment 201 is separated from the stack body 300 to be delivered forward along the retaining unit 10. FIG. 11 and FIG. 12 are side views of the cutting-out apparatus 100 for explaining the separating step. FIG. 13 is a top view illustrating the positional relation between the pushing-out unit 1 and restricting unit 2 and the stack body 300 in the separating step. As illustrated in FIG. 11 and FIG. 12, the separating step is performed in a state of the first rail 10A and the second rail 10B contacting with each other, and the first segment 201 retained by the first rail 10A is delivered to a predetermined transferring position of the second rail 10B. In the separating step, as illustrated in FIG. 11, first, the stopper 50 contacting the first segment 201 is advanced so as to cause the first segment 201 to be movable to the transferring position. Next, as illustrated in FIG. 12, only the pushing-out unit 1 is advanced leaving the restricting unit 2 behind so as to separate the first segment 201 from the stack body 300. Specifically, the control unit 701 drives the first linear actuator 41 of the moving mechanism 4A corresponding to the first pushing-out claw 11 and the first linear actuator 41 of the moving mechanism 4B corresponding to the second pushing-out claw 12 to advance the first moving body 42 of the moving mechanism 4A and the first moving body 42 of the moving mechanism 4B so as to advance the first pushing-out claw 11 and the second pushing-out claw 12. Meanwhile, the control unit 701 does not move the first linear actuator 41 of the moving mechanism 4C corresponding to the first restricting claw 21 and the first linear actuator 41 of the moving mechanism 4D corresponding to the second restricting claw 22 so as not to change the positions of the first restricting claw 21 and the second restricting claw 22. In this manner, as illustrated in FIG. 12, only the pushing-out unit 1 is advanced leaving the restricting unit 2 behind. That is, the pushing-out unit 1 relatively moves forward relative to the restricting unit 2 so that the pushing-out unit 1 and the restricting unit 2 are spaced apart from each other in the front-back direction. The pushing-out unit 1 advances to push the first segment 201 forward. Meanwhile, the restricting unit 2 contacts the second segment 202 so that the forward movement of the second segment 202 following the first segment 201 is restricted. In this manner, the first segment 201 and the second segment 202 are separated from each other. As a result, the first segment 201 is separated from the stack body 300 and delivered forward. The pushing-out unit 1 advances to a position where the first segment 201 contacts the stopper 50. In this manner, the first segment 201 reaches the transferring position of the second rail 10B.

Figure 14:
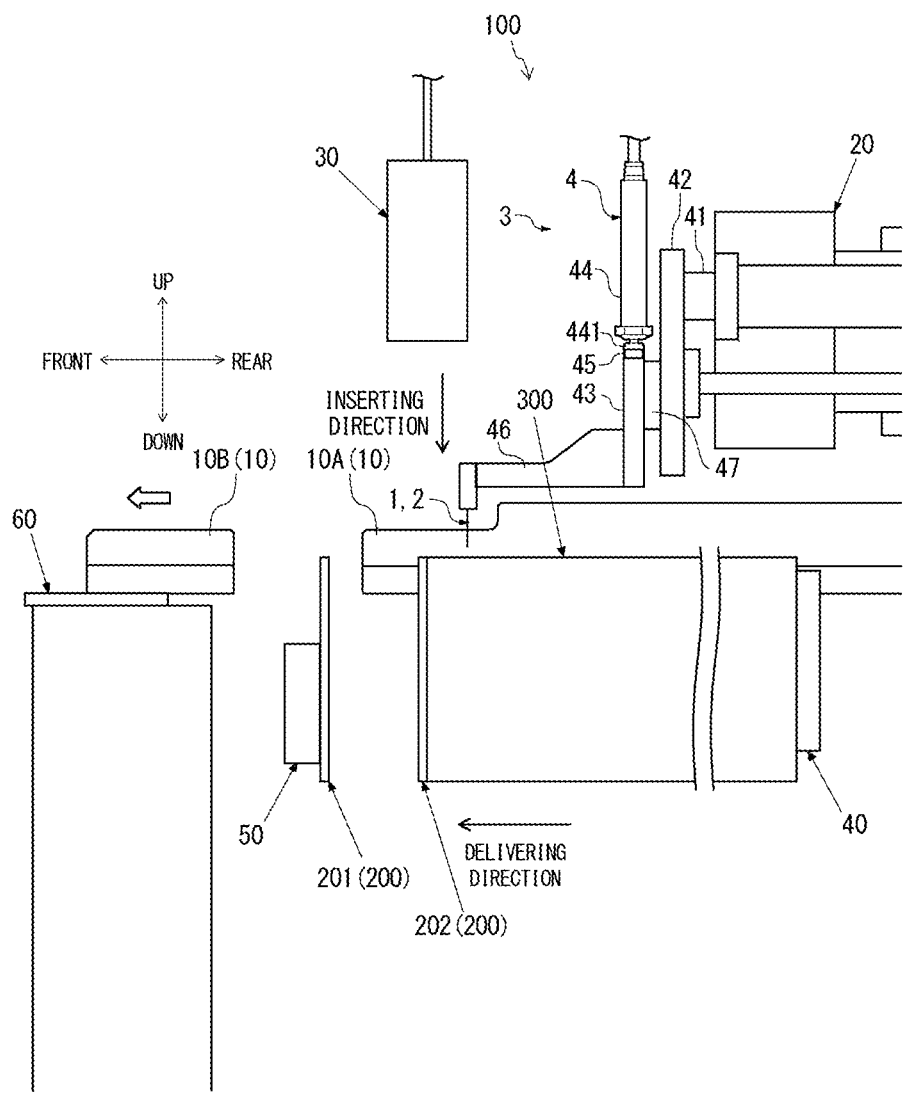
FIG. 14 is a side view of the cutting-out apparatus for explaining a transferring step.

Next, in a transferring step of step S50, the first segment 201 is transferred to an assembling line. FIG. 14 is a side view of the cutting-out apparatus 100 for explaining the transferring step. As illustrated in FIG. 13, in the transferring step, the control unit 701 drives the rail moving unit 60 to advance the second rail 10B so as to separate the first rail 10A and the second rail 10B from each other. In this manner, the retaining unit 10 is withdrawn from the first segment 201 to enable the first segment 201 to be taken out. The first segment 201 is taken out from the cutting-out apparatus 100 by means of a taking-out device (not illustrated) to be delivered to a line in the following step.

As described above, through the steps of step S10 to step S50, the first segment 201 at the tip end is cut out from the stack body 300. The segments 200 are cut out from the stack body 300 one by one by repeating the steps of step S10 to step S50.

Function and Effect

As described above, the cutting-out apparatus 100 according to the present embodiment includes the retaining unit 10 extending in a rail form that is inserted into the hollow part H1 of the cylindrical stack body 300 formed of the plurality of segments 200 stacked in the axial direction so as to retain the stack body 300, the cutting-out unit 20 that separates the first segment 201 at the tip end from the stack body 300 retained by the retaining unit 10 and that delivers the first segment 201 along the retaining unit 10, and the detecting unit 702 that detects the boundary between the segments 200 that are adjacent to each other in the stack body 300. Further, after inserting the pushing-out unit 1 and the restricting unit 2 into the dividing portion P1 that is the boundary between the first segment 201 and the second segment 202 adjacent to the first segment 201 based on the detection result of the detecting unit 702, in a state in which movement of the second segment 202 in the delivering direction (forward) is restricted by the restricting unit 2, the moving unit 3 moves the pushing-out unit 1 in the delivering direction, so that the first segment 201 is separated from the stack body 300, and the first segment 201 is delivered along the retaining unit 10.

According to the cutting-out apparatus 100 as such, by detecting the boundary between the segments 200 that are adjacent to each other by the detecting unit 702, even when a step is formed at the abutment G1 of the segment 200, the pushing-out unit 1 and the restricting unit 2 can be inserted into the dividing portion P1. Further, after inserting the pushing-out unit 1 and the restricting unit 2 into the dividing portion P1, in a state in which movement of the second segment 202 in the delivering direction is restricted by the restricting unit 2, the first segment 201 is moved in the delivering direction by the pushing-out unit 1, so that the first segment 201 and the second segment 202 can be surely separated from each other, and the movement of the second segment 202 in the delivering direction following the first segment 201 can be restricted. In this manner, the segments 200 can be surely cut out from the stack body 300 one by one. As a result, defective cutting out can be reduced. In particular, in cutting out the piston ring with a narrow width (thickness in the axial direction) like the segment as well, the piston rings can be surely cut out one by one.

Further, in the cutting-out apparatus 100 according to the present embodiment, the retaining unit 10 retains the plurality of segments 200 such that the abutments G1 of the plurality of segments 200 are aligned so as to form the slit S1 extending in the axial direction in the stack body 300. Furthermore, the pushing-out unit 1 and the restricting unit 2 are inserted into the dividing portion P1 in the direction from the slit S1 toward the hollow part H1 of the stack body. Moreover, the stack body 300 is sectioned into the first region R1 and the second region R2 by the slit S1 as seen in the direction in which the pushing-out unit 1 and the restricting unit 2 are inserted into the dividing portion P1. In addition, the pushing-out unit 1 includes the first pushing-out claw 11 inserted into the dividing portion P1 in the first region R1 and the second pushing-out claw 12 inserted into the dividing portion P1 in the second region R2, and the restricting unit 2 includes the first restricting claw 21 inserted into the dividing portion P1 in the first region R1 and the second restricting claw 22 inserted into the dividing portion P1 in the second region R2.

That is, the cutting-out apparatus 100 is configured such that the pushing-out unit 1 and the restricting unit 2 are inserted into the dividing portion P1 in each of the first region R1 and the second region R2 that are the regions sandwiching the slit S1. When the positions of the opposite ends 200a, 200b of the piston ring at the abutment G1 are deviated from each other in the axial direction, the adjacent piston rings in the stack body are more likely to be entangled near the abutments. Meanwhile, in the cutting-out apparatus 100, the pushing-out unit 1 and the restricting unit 2 are inserted into both sides of the abutment G1 (slit S1) to perform operation of separating the first segment 201 and the second segment 202 on both sides of the abutment G1, so that the first segment 201 and the second segment 202 can be surely separated from each other. In this manner, the segments 200 can be more surely cut out from the stack body 300 one by one.

In the stack body, in some cases, the position of the dividing portion in the axial direction (that is, the delivering direction) of the piston ring differs between the first region and the second region due to the deformation at the time of forming the piston ring. Meanwhile, in the present embodiment, in inserting the pushing-out unit 1 and the restricting unit 2 into the dividing portion, in the axial direction of the segments 200 in the stack body 300, the first pushing-out claw 11 and the first restricting claw 21 are disposed at the same position, and the second pushing-out claw 12 and the second restricting claw 22 are disposed at the same position that is deviated from the first pushing-out claw 11 and the first restricting claw 21. In this manner, the pushing-out unit 1 and the restricting unit 2 can be inserted into the dividing portion P1 in each of the first region R1 and the second region R2.

Further, in the present embodiment, the detecting unit 702 acquires the images of the first region R1 and the second region R2 and detects the dividing portion P1 in each of the first region R1 and the second region R2 based on the images acquired. As described above, there are some cases in which the position of the dividing portion in the axial direction of the piston ring differs between the first region and the second region, but in the cutting-out apparatus 100 according to the present embodiment, the dividing portion P1 in each of the first region R1 and the second region R2 is detected, so that the pushing-out unit 1 and the restricting unit 2 can be surely inserted into the dividing portion P1 in each of the first region R1 and the second region R2.

Furthermore, the moving unit 3 includes the rod 441 of the second linear actuator 44 that moves in the direction in which the pushing-out unit 1 and the restricting unit 2 are inserted into the dividing portion P1, and the pushing-out unit 1 and the restricting unit 2 are coupled to the rod 441 via the coupling member 45 that is a floating joint such that the pushing-out unit 1 and the restricting unit 2 can be displaced relative to the rod 441 in the axial direction of the segment 200 in the stack body 300. According to this, when inserting the pushing-out unit 1 and the restricting unit 2 into the dividing portion P1, any deviation between the positions of the pushing-out unit 1 and the restricting unit 2 and of the dividing portion P1 in the axial direction of the segment 200 or any deviation angle when the pushing-out unit 1 and the restricting unit 2 are inclined relative to the inserting direction can be accepted, so that inserting the pushing-out unit 1 and the restricting unit 2 into the dividing portion P1 can be facilitated. In this manner, the pushing-out unit 1 and the restricting unit 2 can be surely inserted into the dividing portion P1. Note that the rod 441 is an example of an "inserting unit" according to the present invention.

Others

The preferable embodiment of the present invention has been described above, but various changes, modifications, combinations, and the like are available for the cutting-out apparatus according to the embodiment. For example, in the above-described embodiment, the retaining unit is horizontally provided, but the present invention is not limited thereto.

REFERENCE SIGNS LIST

100: cutting-out apparatus
10: retaining unit
20: cutting-out unit
30: camera
1: pushing-out unit
11: first pushing-out claw
12: second pushing-out claw
2: restricting unit
21: first restricting claw
22: second restricting claw
3: moving unit
4: moving mechanism

The invention claimed is:

1. A cutting-out apparatus for a piston ring comprising:
a retaining unit extending in a rail form that is inserted into a hollow part of a cylindrical stack body formed of a plurality of piston rings stacked in an axial direction so as to retain the stack body;
a cutting-out unit that separates a piston ring at a tip end of the stack body from the stack body retained by the retaining unit and that delivers the piston ring at the tip end along the retaining unit; and
a detecting unit that detects a boundary between the piston rings that are adjacent to each other in the stack body, wherein
the cutting-out unit includes a pushing-out unit, a restricting unit, and a moving unit that moves the pushing-out unit and the restricting unit, and
after inserting the pushing-out unit and the restricting unit into a dividing portion that is a boundary between the piston ring at the tip end and a piston ring that is adjacent to the piston ring at the tip end in the stack body based on a detection result of the detecting unit, in a state in which movement of the piston ring that is adjacent to the piston ring at the tip end in a delivering direction in which the piston ring at the tip end is delivered is restricted by the restricting unit, the moving unit moves the pushing-out unit in the delivering direction, so that the piston ring at the tip end is separated from the stack body, and the piston ring at the tip end is delivered along the retaining unit.

2. The cutting-out apparatus for a piston ring according to claim 1, wherein
the retaining unit retains the stack body such that abutments of the plurality of piston rings are aligned so as to form a slit in the stack body extending in the axial direction of the stack body,
the pushing-out unit and the restricting unit are inserted into the dividing portion in a direction from the slit toward the hollow part of the stack body,
the stack body is sectioned into a first region and a second region by the slit as seen in a direction in which the pushing-out unit and the restricting unit are inserted into the dividing portion,
the pushing-out unit includes a first pushing-out claw inserted into the dividing portion in the first region and a second pushing-out claw inserted into the dividing portion in the second region, and
the restricting unit includes a first restricting claw inserted into the dividing portion in the first region and a second restricting claw inserted into the dividing portion in the second region.

3. The cutting-out apparatus for a piston ring according to claim 2, wherein the detecting unit acquires images of the first region and the second region and detects the dividing portion in each of the first region and the second region based on the images acquired.

4. The cutting-out apparatus for a piston ring according to claim 1, wherein
the moving unit includes an insertion member that moves in a direction in which the pushing-out unit and the restricting unit are inserted into the dividing portion of the stack body, and
the pushing-out unit and the restricting unit are coupled to the insertion member such that the pushing-out unit and the restricting unit can be displaced relative to the insertion member in the axial direction of the piston rings in the stack body.

5. The cutting-out apparatus for a piston ring according to claim 2, wherein the moving unit includes an insertion member that moves in the direction in which the pushing-out unit and the restricting unit are inserted into the dividing portion of the stack body, and
the pushing-out unit and the restricting unit are coupled to the insertion member such that the pushing-out unit and the restricting unit can be displaced relative to the insertion member in the axial direction of the piston rings in the stack body.

6. The cutting-out apparatus for a piston ring according to claim 3, wherein
the moving unit includes an insertion member that moves in the direction in which the pushing-out unit and the restricting unit are inserted into the dividing portion of the stack body, and
the pushing-out unit and the restricting unit are coupled to the insertion member such that the pushing-out unit and the restricting unit can be displaced relative to the insertion member in the axial direction of the piston rings in the stack body.

* * * * *